United States Patent
Sung et al.

(10) Patent No.: US 10,085,223 B1
(45) Date of Patent: Sep. 25, 2018

(54) WIRELESS REPEATER SYSTEM TO MODIFY AN AUTOMATIC GAIN CONTROL TIMER

(71) Applicant: Sprint Communications Company L.P., Overland Park, KS (US)

(72) Inventors: Sanghoon Sung, Ashburn, VA (US); Udit A. Thakore, Fairfax, VA (US); George William Harter, III, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 35 days.

(21) Appl. No.: 15/405,588

(22) Filed: Jan. 13, 2017

(51) Int. Cl.
| | |
|---|---|
| *H04W 52/52* | (2009.01) |
| *H04W 84/04* | (2009.01) |
| *H04L 25/20* | (2006.01) |
| *H04B 17/318* | (2015.01) |
| *H04B 7/155* | (2006.01) |
| *H04W 84/12* | (2009.01) |

(52) U.S. Cl.
CPC ........ *H04W 52/52* (2013.01); *H04B 7/15507* (2013.01); *H04B 17/318* (2015.01); *H04L 25/20* (2013.01); *H04W 84/047* (2013.01); *H04W 84/12* (2013.01)

(58) Field of Classification Search
CPC ... H04W 84/047; H04W 52/52; H04W 25/20; H04L 25/20
See application file for complete search history.

(56) References Cited

U.S. PATENT DOCUMENTS

| | | | |
|---|---|---|---|
| 7,233,771 | B2 | 6/2007 | Proctor, Jr. et al. |
| 7,911,985 | B2 | 3/2011 | Proctor, Jr. et al. |

FOREIGN PATENT DOCUMENTS

| | | |
|---|---|---|
| CN | 102170690 | 8/2011 |

*Primary Examiner* — Ashley L Shivers

(57) ABSTRACT

The technology described herein enhances the operation of a wireless repeater system to set an Automatic Gain Control (AGC) timer. In one implementation, the wireless repeater wirelessly receives a receive data signal having a receive energy level. The wireless repeater periodically processes the receive energy level per the AGC timer to calculate an AGC amount. The wireless repeater also applies the AGC amount to the received data signal to generate a transmit data signal, and wirelessly transfers the transmit data signal. The wireless RF repeater determines an energy fluctuation in the receive data signal, and when the energy fluctuation in the receive data signal exceeds a fluctuation threshold, the wireless repeater decreases the AGC timer.

20 Claims, 5 Drawing Sheets

WIRELESS REPEATER SYSTEM TO MODIFY AN AUTOMATIC GAIN CONTROL TIMER

TECHNICAL BACKGROUND

Wireless communication devices are used for voice and video calling, Internet access, media streaming, data messaging, email, and the like. Wireless communication devices use wireless radio frequency (RF) communication systems to transmit data. A typical wireless RF communication network includes wireless access points to extend the range of their communication services and enable user mobility. The wireless access points exchange user communications between wireless communication devices, service providers, and other end user devices.

In a wireless access point, when a data signal is received at an antenna, it is filtered, amplified, demodulated, and delivered to a baseband unit. However, data signals may have varying signal strengths based on network and environmental conditions. If the received data signal is too weak or strong, Automatic Gain Control (AGC) may be applied to provide a controlled and consistent signal power.

A wireless access point receives a wireless signal, applies AGC to the received signal, and transmits the modified version of the received signal to the wireless communication device. Likewise, the wireless access point receives a wireless signal from the wireless communication device, applies AGC to the received signal, and then transmits the modified version of the signal to the core network.

To extend the wireless service footprint even more, wireless repeaters are used between the wireless access points and the wireless communication devices. The wireless repeaters may be linked together to form a repeater chain that extends from the wireless access point. Cell breathing describes the situation when a wireless access point cell coverage shrinks as its load increases. In other words, a higher number of users results in more interference, lowering the cell coverage radius. Wireless repeaters increase the load of the connected wireless access point(s). As the load increases, it is more important to apply AGC to keep a constant transmit power to keep cell coverage constant.

OVERVIEW

Examples disclosed herein provide a system, method, hardware, and software to set an Automatic Gain Control (AGC) timer in a wireless repeater system. The wireless repeater wirelessly receives a receive data signal having a receive energy level. The wireless repeater periodically processes the receive energy level per the AGC timer to calculate an AGC amount. The wireless repeater applies the AGC amount to the received data signal to generate a transmit data signal, and wirelessly transfers the transmit data signal. The wireless repeater determines an energy fluctuation in the receive data signal, and decreases the AGC timer when the energy fluctuation in the receive data signal exceeds a fluctuation threshold.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention, and that the features described below can be combined in various ways to form multiple variations of the invention. As a result, the invention is not limited to the specific examples described below, but only by the claims and their equivalents.

Figure 1:
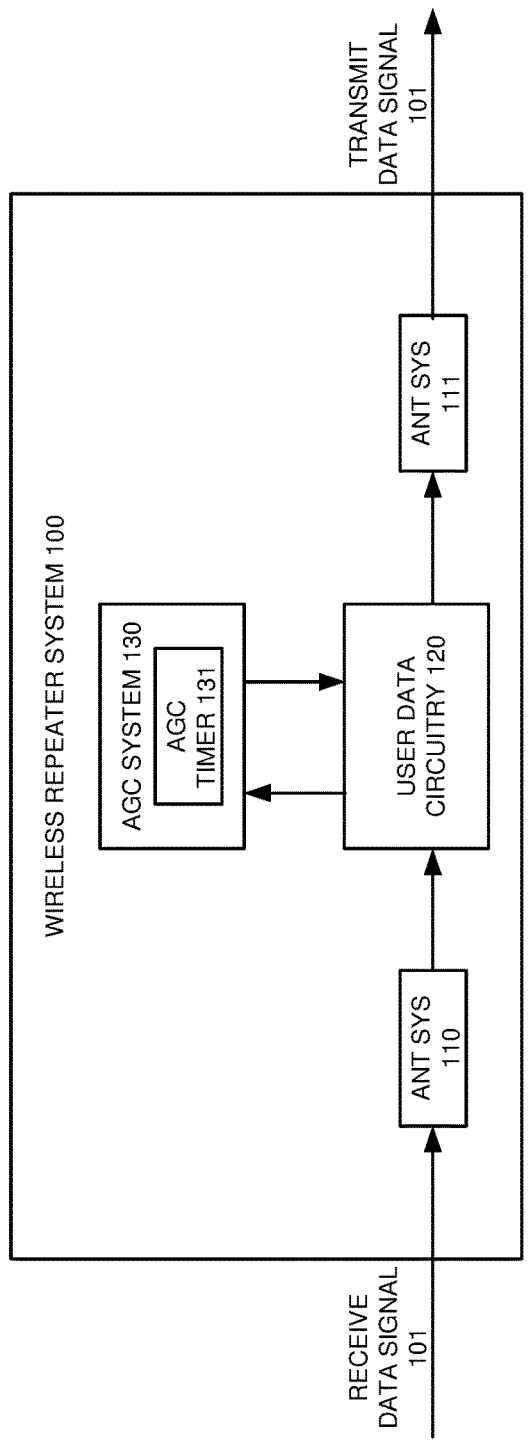
FIG. 1 is a block diagram that illustrates a wireless repeater system to set an Automatic Gain Control (AGC) timer.

FIG. 1 illustrates wireless repeater system 100 to set an Automatic Gain Control (AGC) timer. Wireless repeater system 100 includes receive/transmit data signal 101, antenna systems 110-111, user data circuitry 120, and AGC system 130. AGC system 130 includes AGC timer 131. Examples of wireless repeater system 100 may be a wireless relay, micro cell, nano cell, femto cell, pico cell, or some other form of network cell configured to receive wireless data signals as part of a multi-repeater cascading system. Antenna systems 110-111 may comprise an electromagnetic antenna array, a dipole antenna, or some other form of RF antenna configured to receive/transmit a wireless data signal.

In operation, wireless repeater system 100 receives receive data signal 101 having a receive energy level. In some examples, receive data signal 101 comprises a Code Division Multiple Access (CDMA) pilot or a Long Term Evolution (LTE) Reference Signal (RS). Examples of energy levels include a Received Signal Strength Indicator (RSSI), Reference Signal Received Power (RSRP), Reference Signal Received Quality (RSRQ), and/or other network metrics—including combinations thereof. In some examples, antenna system 110 comprises a receiver and antenna system 111 comprises a transceiver.

Wireless repeater system 100 periodically processes the receive energy level per the AGC timer to calculate an AGC amount. For example, AGC is applied to a varying data signal to generate a constant data signal. Wireless repeater system may measure the RSSI or RSRP to determine the energy level for received data signal 101. Wireless repeater system 100 applies the AGC amount to received data signal 101 to generate transmit data signal 101, and wirelessly transfers transmit data signal 101.

Wireless repeater system 100 determines an energy fluctuation in receive data signal 101, and decreases the AGC timer when the energy fluctuation in receive data signal 101 exceeds a fluctuation threshold. In some examples, the AGC timer comprises an AGC update timer or a timer for remeasuring the energy level of received data signal 101. For instance, the fluctuation threshold may be preset by the operator to 10 dBm, so when the fluctuation of energy of receive data signal 101 exceeds the fluctuation threshold, the AGC update timer is decreased. Due to the large change in the energy level of received data signal 101 it is important to decrease the time between measurements to ensure a constant power of received data signal 101. In some examples, the AGC timer is reset at the expiry of the AGC timer. Although not required, wireless repeater 100 may increase the AGC timer when the energy fluctuation in receive data signal 101 does not exceed the fluctuation threshold.

Figure 2:
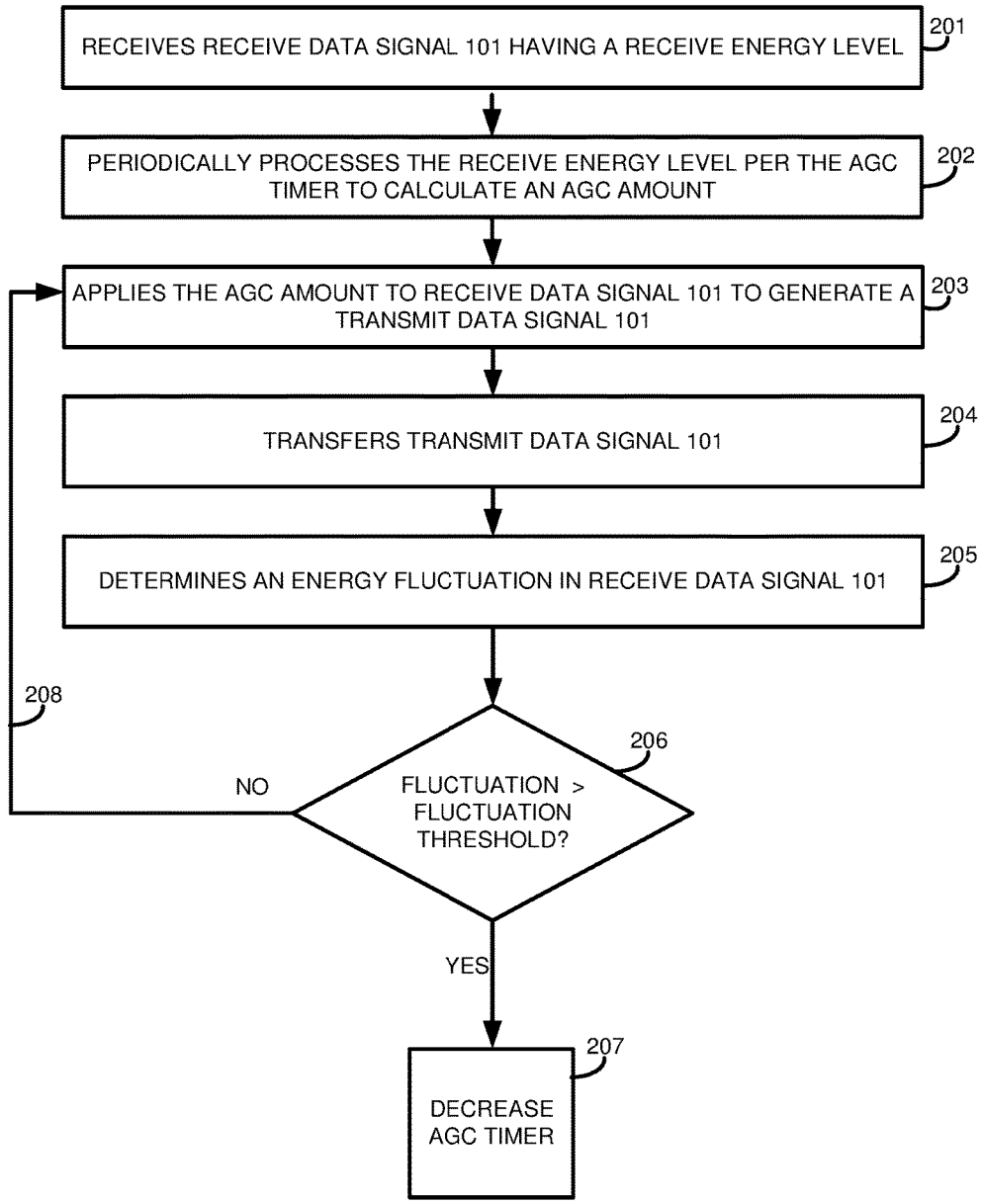
FIG. 2 is a flow diagram that illustrates the operation of the wireless repeater system to set the AGC timer.

To further demonstrate the operations of wireless repeater system 100, FIG. 2 is provided. FIG. 2 illustrates a method of operating wireless repeater system 100 to set the AGC timer. The operations of FIG. 2 are referenced parenthetically in the paragraphs that follow, along with references to the elements and systems from wireless repeater system 100 of FIG. 1.

Wireless repeater system 100 wirelessly receives a receive data signal having a receive energy level (201). For example, wireless repeater system 100 may receive a RS from a connected LTE eNodeB. Wireless repeater system 100 periodically processes the receive energy level of receive data signal 101 per the AGC timer to calculate an AGC amount (202). Wireless repeater system 100 applies the AGC amount to received data signal 101 to generate a transmit data signal (203), and wirelessly transfers transmit data signal 101 (204).

Wireless repeater system 100 determines an energy fluctuation in receive data signal 101 (205). If the energy fluctuation in receive data signal 101 exceeds a fluctuation threshold (206), wireless repeater system 100 decreases the AGC timer (207). If the energy fluctuation in receive data signal 101 does not exceed the fluctuation threshold (208), wireless repeater system 100 applies the AGC amount to receive data signal 101 to generate transmit data signal 101 (203).

Figure 3:
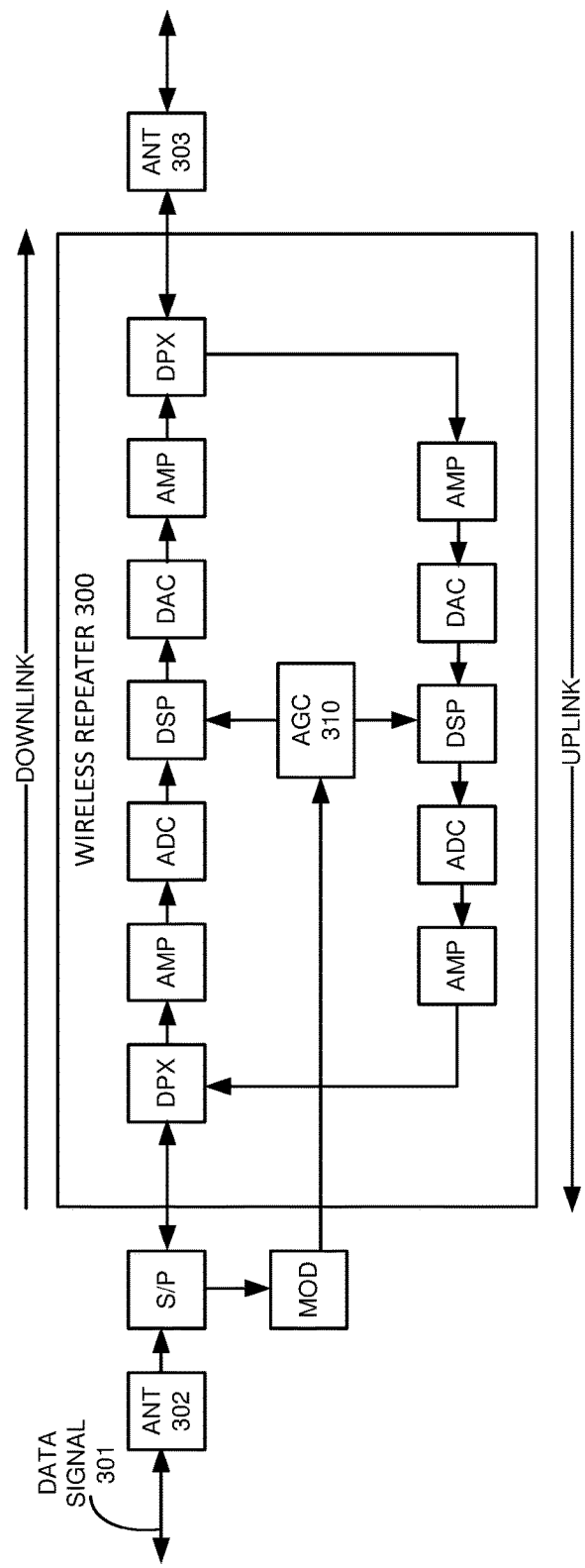
FIG. 3 is a block diagram that illustrates a wireless repeater to dynamically set an AGC timer in an exemplary embodiment.

FIG. 3 illustrates an exemplary embodiment of wireless repeater 300 to set an AGC timer. Wireless repeater 300 is an example of wireless repeater system 100, although wireless repeater 300 may use alternative configurations and operations. FIG. 3 includes wireless repeater 300, data signal 301, antenna systems 302-303, AGC system 310, a splitter (S/P), and a modem (MOD). Wireless repeater 300 includes duplexers (DPX), amplifiers (AMP), analog to digital converters (ADC), digital signaling processing systems (DSP), and digital to analog converters (DAC).

In operation, a data signal 301 is wirelessly received at antenna system 302. Data signal 301 is delivered through a splitter, which splits data signal 301 and transfers data signal 301 to a modem and a duplexer. The duplexer transfers data signal 301 to an amplifier, which transfers it to an analog to digital converter. The converter transfers data signal 301 to a data signal processor. After processing, data signal 301 is transferred to a digital to analog convertor, which converts data signal 301 and transfers it to an amplifier. The amplifier transfers data signal 301 to a duplexer that transfers data signal to antenna system 303. Downlink data signals go from left to right and uplink data signals go from right to left. The modem transfers data signal 301 to AGC system 310, which processes data signal 301 and determines whether to apply AGC. AGC 310 transfers AGC instructions to the data signal processors, as needed. In some examples, the same AGC instruction is sent to the data signal processors in both the downlink and uplink. AGC system 310 may also include an AGC timer, that is increased or decreased based on the energy level of the data signal(s).

Figure 4:
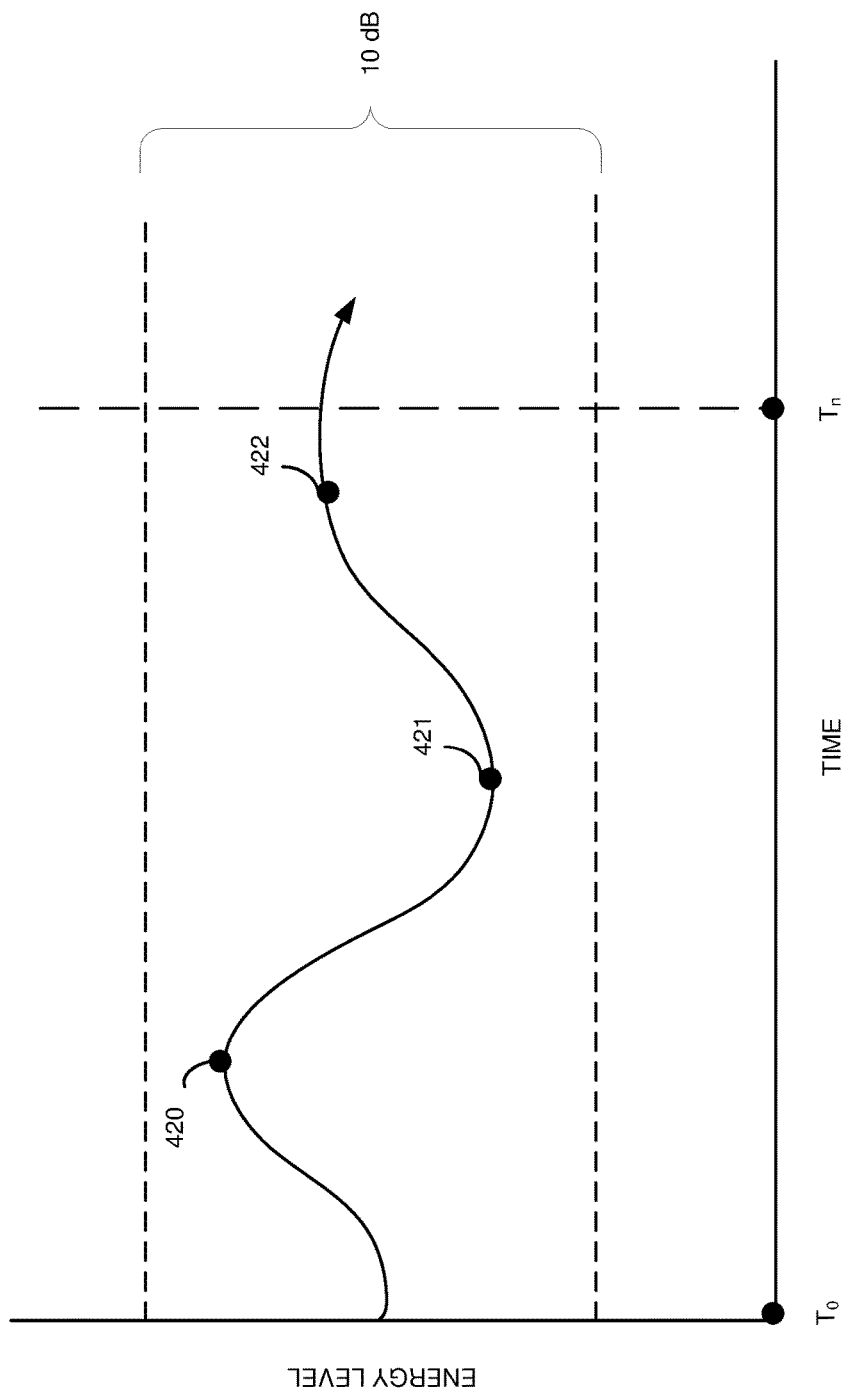
FIGS. 4-5 are data signal energy plots that illustrate different scenarios for the wireless repeater system.
Figure 5:
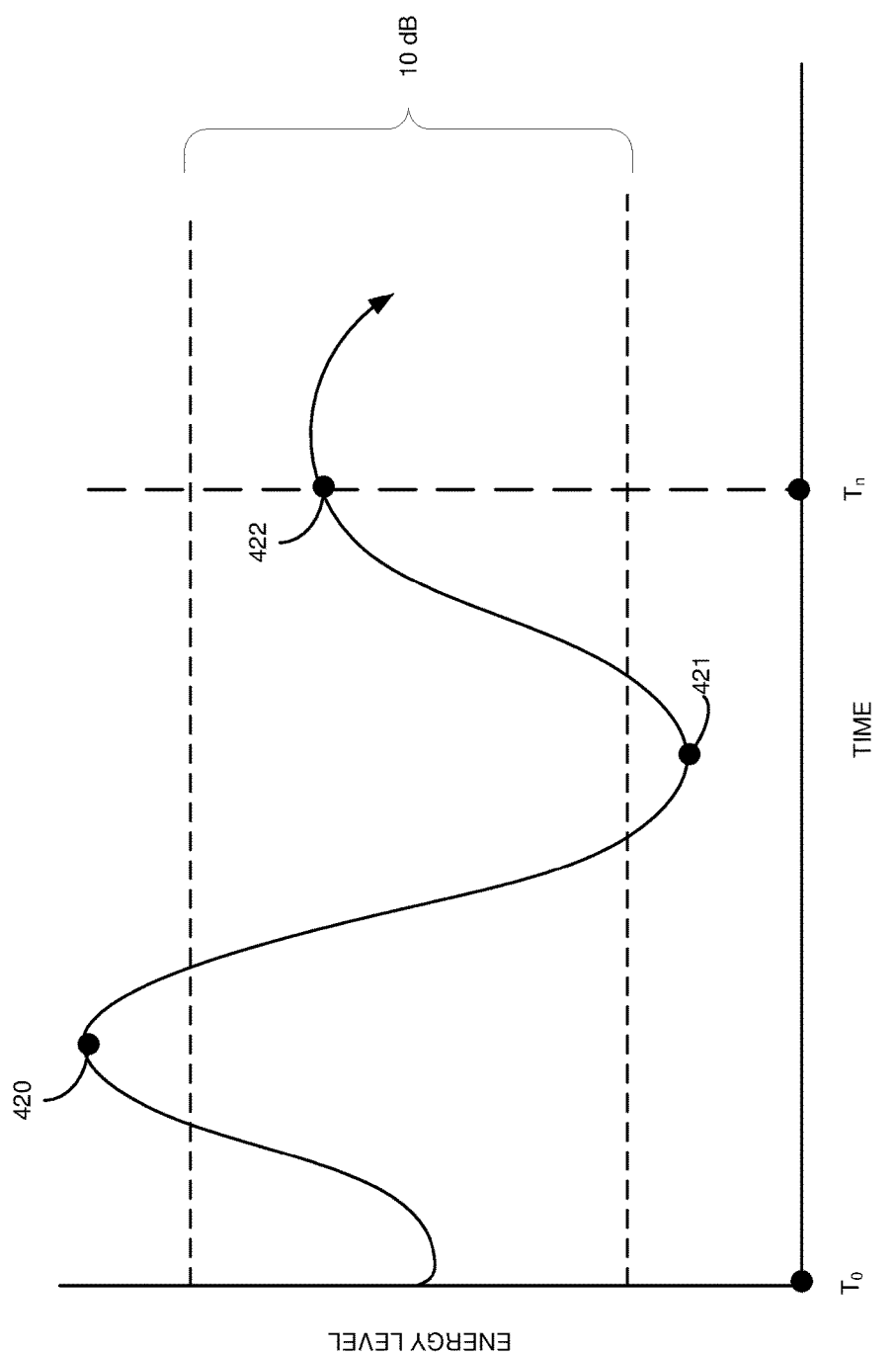

FIGS. 4-6 are data signal plots that illustrate different scenarios for the operability of AGC in wireless RF system 100 or 300.

FIG. 4 graphically represents the energy level of a data signal received by a wireless repeater system during a time window ($T_0$-$T_n$). The time window may represent the time in between energy level measurements or the AGC timer. The data signal is plotted with time on the x-axis and energy level on the y-axis. It should be noted that the energy level could comprise Signal to Noise Ratio (SNR), Signal to Interference plus Noise Ratio (SINR), Reference Signal Received Quality (RSRQ), Reference Signal Received Power (RSRP), or Reference Signal Strength Indicator (RSSI).

Points 420-422 represent the energy fluctuations of the data signal. The data signal reaches a maximum energy level at point 420 and a minimum energy level at point 421. However, the fluctuation of the energy level of data signal does not exceed the fluctuation threshold (10 dBm), therefore the AGC timer will not be decreased. In some examples, the AGC timer may be increased.

FIG. 5 illustrates another example the data signal received by a wireless repeater system in a different scenario from FIG. 4. Again, the data signal reaches a maximum energy level at point 420 and a minimum energy level at point 421. The energy change or fluctuation between points 420 and 421 is greater than 10 dBm or the energy fluctuation threshold, therefore the AGC timer will be decreased.

Referring back to FIG. 1, wireless repeater system 100 comprises Radio Frequency (RF) communication circuitry and an antenna. The RF communication circuitry comprises an amplifier, filter, modulator, and signal processing circuitry. Wireless repeater system 100 may comprise a remote radio head. Further, wireless repeater system may use a cellular technology such as Code Division Multiple Access (CDMA), Long Term Evolution (LTE), and/or Wireless Fidelity (WIFI).

Wireless data signal 101 uses the air or space as the transport media. Wireless data signal 101 may use various protocols, such as CDMA, Evolution Data Only (EVDO), Worldwide Interoperability for Microwave Access (WI-MAX), Global System for Mobile Communication (GSM), LTE, WIFI, High Speed Packet Access (HSPA), or some other wireless communication format.

What is claimed is:

1. A method of operating a wireless repeater to set an Automatic Gain Control (AGC) timer, the method comprising:

a receive wireless repeater antenna wirelessly receiving a receive data signal having a receive energy level;

wireless repeater Radio Frequency (RF) circuitry periodically processing the receive energy level per the AGC timer to calculate an AGC amount;

the wireless repeater RF circuitry applying the AGC amount to the received data signal to generate a transmit data signal;

a transmit wireless repeater antenna wirelessly transferring the transmit data signal;

the wireless RF repeater RF circuitry determining an energy fluctuation in the receive data signal; and the wireless RF repeater RF circuitry decreasing the AGC timer when the energy fluctuation in the receive data signal exceeds a fluctuation threshold.

2. The method of claim 1 further comprising the wireless RF repeater RF circuitry increasing the AGC timer when the energy fluctuation in the receive data signal does not exceed the fluctuation threshold.

3. The method of claim 1 wherein the energy fluctuation exceeds the fluctuation threshold when the receive energy level exceeds a minimum threshold and a maximum threshold during a same AGC timer period.

4. The method of claim 1 wherein the energy fluctuation exceeds the fluctuation threshold when the receive energy level exceeds a minimum threshold and a maximum threshold during consecutive AGC timer periods.

5. The method of claim 1 wherein the receive energy level comprises a Received Signal Strength Indicator (RSSI).

6. The method of claim 1 wherein the receive energy level comprises Reference Signal Received Power (RSRP).

7. The method of claim 1 wherein the receive energy level comprises Reference Signal Received Quality (RSRQ).

8. The method of claim 1 wherein the receive data signal and the transmit data signal comprise Long Term Evolution (LTE) signals.

9. The method of claim 1 wherein the receive data signal and the transmit data signal comprise Code Division Multiple Access (CDMA) signals.

10. The method of claim 1 wherein the receive data signal and the transmit data signal comprise Wireless Fidelity (WiFi) signals.

11. A wireless repeater to set an Automatic Gain Control (AGC) timer, the wireless repeater comprising:
a wireless repeater receive antenna configured to wirelessly receive a receive data signal having a receive energy level;
wireless repeater Radio Frequency (RF) circuitry configured to periodically process the receive energy level per the AGC timer to calculate an AGC amount;
the wireless repeater RF circuitry configured to apply the AGC amount to the receive data signal to generate a transmit data signal;
a wireless repeater transmit antenna configured to wirelessly transfer the transmit data signal;
the wireless repeater RF circuitry configured to determine an energy fluctuation in the receive data signal; and
the wireless repeater RF circuitry configured to decrease the AGC timer when the energy fluctuation in the receive data signal exceeds a fluctuation threshold.

12. The wireless repeater of claim 11 further comprising the wireless repeater RF circuitry configured to increase the AGC timer when the energy fluctuation in the receive data signal does not exceed the fluctuation threshold.

13. The wireless repeater of claim 11 wherein the energy fluctuation exceeds the fluctuation threshold when the receive energy level exceeds a minimum threshold and a maximum threshold during a same AGC timer period.

14. The wireless repeater of claim 11 wherein the energy fluctuation exceeds the fluctuation threshold when the receive energy level exceeds a minimum threshold and a maximum threshold during consecutive AGC timer periods.

15. The wireless repeater of claim 11 wherein the receive energy level comprises a Received Signal Strength Indicator (RSSI).

16. The wireless repeater of claim 11 wherein the receive energy level comprises Reference Signal Received Power (RSRP).

17. The wireless repeater of claim 11 wherein the receive energy level comprises Reference Signal Received Quality (RSRQ).

18. The wireless repeater of claim 11 wherein the receive data signal and the transmit data signal comprise Long Term Evolution (LTE) signals.

19. The wireless repeater of claim 11 wherein the receive data signal and the transmit data signal comprise Code Division Multiple Access (CDMA) signals.

20. The wireless repeater of claim 11 wherein the receive data signal and the transmit data signal comprise Wireless Fidelity (WiFi) signals.

* * * * *